US00RE47531E

(19) United States
(12) Reissued Patent
Steinbock

(10) Patent Number: US RE47,531 E
(45) Date of Reissued Patent: Jul. 23, 2019

(54) FIREARM RETAINING APPARATUS

(71) Applicant: Mark D. Steinbock, Austin, TX (US)

(72) Inventor: Mark D. Steinbock, Austin, TX (US)

(21) Appl. No.: 15/913,707

(22) Filed: Mar. 6, 2018

Related U.S. Patent Documents

Reissue of:
(64) Patent No.: 9,360,273
Issued: Jun. 7, 2016
Appl. No.: 15/004,094
Filed: Jan. 22, 2016

U.S. Applications:
(60) Provisional application No. 62/149,902, filed on Apr. 20, 2015.

(51) Int. Cl.
*F41C 27/00* (2006.01)
*F41A 23/18* (2006.01)

(52) U.S. Cl.
CPC ..... *F41C 27/00* (2013.01); *F41A 23/18* (2013.01)

(58) Field of Classification Search
USPC ..... 600/15
See application file for complete search history.

(56) References Cited

U.S. PATENT DOCUMENTS 2,372,685 A * 4/1945 Schaich ..... F42B 39/08 198/803.6
2,597,601 A * 5/1952 Sherman ..... A42B 1/24 2/175.3
2,641,793 A * 6/1953 Wilm ..... A47J 45/10 15/220.2
2,910,804 A * 11/1959 White ..... F41C 33/0263 2/300
3,161,932 A * 12/1964 Russell ..... A41F 1/002 24/303
3,178,784 A * 4/1965 Krauthamer ..... B43K 23/001 2/250
3,546,643 A * 12/1970 Virostek ..... H01F 7/0215 335/303
3,566,526 A * 3/1971 Violette ..... B65D 25/10 211/64
3,921,620 A * 11/1975 Nakayama ..... A61N 2/06 600/15
3,943,912 A * 3/1976 Nakayama ..... A61F 5/03 600/15
4,587,956 A * 5/1986 Griffin ..... A61N 2/06 600/15
4,826,059 A * 5/1989 Bosch ..... A45C 11/24 206/350
4,858,361 A * 8/1989 White ..... F41A 35/02 150/154

(Continued)

FOREIGN PATENT DOCUMENTS

CA 1237481 A1 * 5/1988
DE 3227506 A1 * 1/1984 ..... A43B 1/0054
JP 2001037891 A * 2/2001

OTHER PUBLICATIONS

English Machine Translation of DE-3227506-A1 retrieved from http://translationportal.epo.org/emtp/translate?ACTION=description-retrieval&COUNTRY=DE&ENGINE=google&FORMAT=docdb&KIND=A1&LOCALE=en_EP&NUMBER=3227506&OPS=ops.epo.org%2F3.2&SRCLANG=de&TRGLANG=en&apikey=TSMqTfrVAvNtryGl8Qlfbozj8DnAGlqJ&PDF=vGcgfViHwGj2iP3z.*

(Continued)

*Primary Examiner* — Jeffrey R Jastrzab
(74) *Attorney, Agent, or Firm* — Craige Thompson; Thompson Patent Law; Vincent Musgrove

(57) ABSTRACT

Embodiments provide a firearm retaining apparatus.

29 Claims, 7 Drawing Sheets

(56) References Cited

U.S. PATENT DOCUMENTS 5,593,073 A * 1/1997 Finnegan ..... A44C 5/0007 224/183
5,682,653 A * 11/1997 Berglof ..... G09F 1/10 224/183
5,758,807 A * 6/1998 Wright ..... A45F 5/02 224/183
5,791,608 A * 8/1998 Nielsen ..... B44D 3/125 206/362.4
6,554,787 B1 * 4/2003 Griffin ..... A61F 7/02 601/70
6,587,022 B1 * 7/2003 Devine ..... A45F 5/00 206/350
6,779,199 B1 * 8/2004 O'Dea ..... A41D 19/01594 2/160
7,322,068 B1 * 1/2008 Kim ..... A47K 10/02 15/209.1
8,739,453 B1 * 6/2014 Conner ..... F41A 23/18 248/206.5
2002/0104151 A1 * 8/2002 Rauscher ..... A41F 9/002 2/338
2003/0230606 A1 * 12/2003 Devinie ..... A45F 5/00 224/183
2004/0104320 A1 * 6/2004 Exler ..... A47G 23/0225 248/206.5
2008/0185414 A1 * 8/2008 Conlon ..... A45F 5/02 224/674
2009/0050657 A1 * 2/2009 Woolery ..... A45F 3/14 224/183
2009/0314813 A1 * 12/2009 Woolery ..... A45F 5/02 224/183
2012/0005930 A1 * 1/2012 Cragg ..... F41A 11/02 42/1.06
2012/0121311 A1 * 5/2012 Torres ..... B43K 23/001 401/131
2012/0138245 A1 * 6/2012 Affonso ..... A47H 19/00 160/349.2
2013/0074392 A1 * 3/2013 Mccaffery ..... F42B 39/02 42/90
2013/0254976 A1 * 10/2013 Aravena ..... F42B 39/02 2/300
2013/0331637 A1 * 12/2013 Greff ..... A61N 1/40 600/15
2015/0013205 A1 * 1/2015 Franklin ..... A45F 5/021 42/94
2015/0040457 A1 * 2/2015 Borkowski ..... F41C 33/001 42/94
2015/0107061 A1 * 4/2015 Stutz ..... A61N 2/06 24/303
2015/0216276 A1 * 8/2015 Stratton ..... A45C 11/00 224/183
2015/0260479 A1 * 9/2015 Aravena ..... A45F 5/00 224/183
2015/0362280 A1 * 12/2015 Dale ..... F41A 35/02 42/96
2018/0073837 A1 * 3/2018 Bahu ..... F41C 33/06

OTHER PUBLICATIONS

NRA Multi-Magnets. The Official NRA Store [online]. National Rifle Association, 2015 [retrieved on Mar. 5, 2018]. Retrieved from the Internet: <URL: http://www.nrastore.com/nra-multi-magnets-sa-24582>.

* cited by examiner

FIREARM RETAINING APPARATUS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application claims priority to U.S. Provisional Patent Application 62/149,902, filed Apr. 20, 2015, which is hereby incorporated by reference in its entirety.

FIELD OF THE INVENTION

The present disclosure relates to a firearm retaining apparatus. Embodiments relate to a magnetic portion which may be affixed to a portion of a firearm and a magnetic surface in order to keep a firearm in a fixed position.

BACKGROUND OF THE INVENTION

The whereabouts of a firearm in a home or other setting is very important. Misplaced firearms often end up in the wrong hands, whether the hands are of a child or a criminal. A simple means to affix the firearm to a desired spot that is specified by its owner may provide the owner with a peace of mind knowing that the firearm is not missing or in the wrong hands. In addition, a firearm owner may want to store a firearm in a convenient location.

The disclosed subject matter provides a firearm retaining apparatus. The apparatus may comprise a magnetic portion enveloped in a covering.

BRIEF SUMMARY OF THE INVENTION

The disclosed subject matter provides a firearm retaining apparatus. The apparatus may retain a firearm or another magnet compatible structure in a stable state in conjunction with a magnet compatible surface, such as, but not limited to an interior wall of a safe. The apparatus may comprise an inner portion including a magnetic element. The length of the magnetic element may be aligned along a major axis while the width of the magnetic element may be aligned along a minor axis.

The apparatus may further comprise a covering including a first tab portion and second tab portion with the first tab portion comprising a first protrusion portion and the second tab portion comprising a second protrusion portion. The outer covering may further comprise a middle portion positioned between the first tab portion and second tab portion. The entirety of the covering may include an interior surface and an exterior surface. The interior surface of the middle portion may be positioned adjacent to the magnetic element and, in different embodiments, may either come in contact with the magnetic element or not come in contact with the magnetic element. In embodiments, the exterior surface of the covering may comprise a rubberized texture. The structure, materials, and arrangement of the outer covering may reduce the force required to disengage the apparatus from magnetic engagement with one or more surfaces. This may allow for an individual to more easily remove the magnet from a magnet compatible surface. The tab portions may act as lever arms that may reduce the amount of force one must exert in order to disengage the magnetic element.

BRIEF DESCRIPTION OF THE DRAWINGS

The novel features believed characteristic of the disclosed subject matter will be set forth in any claims that are filed now and/or later. The disclosed subject matter itself, however, as well as a preferred mode of use, further objectives, and advantages thereof, will best be understood by reference to the following detailed description of an illustrative embodiment when read in conjunction with the accompanying drawings, wherein:

DETAILED DESCRIPTION OF ILLUSTRATIVE EMBODIMENTS

Reference now should be made to the drawings, in which the same reference numbers are used throughout the different figures to designate the same components.

It will be understood that, although the terms first, second, third, etc. may be used herein to describe various elements, these elements should not be limited by these terms. These terms are only used to distinguish one element from another element. Thus, a first element discussed below could be termed a second element without departing from the teachings of the present disclosure.

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprises" and/or "comprising" or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Figure 1:
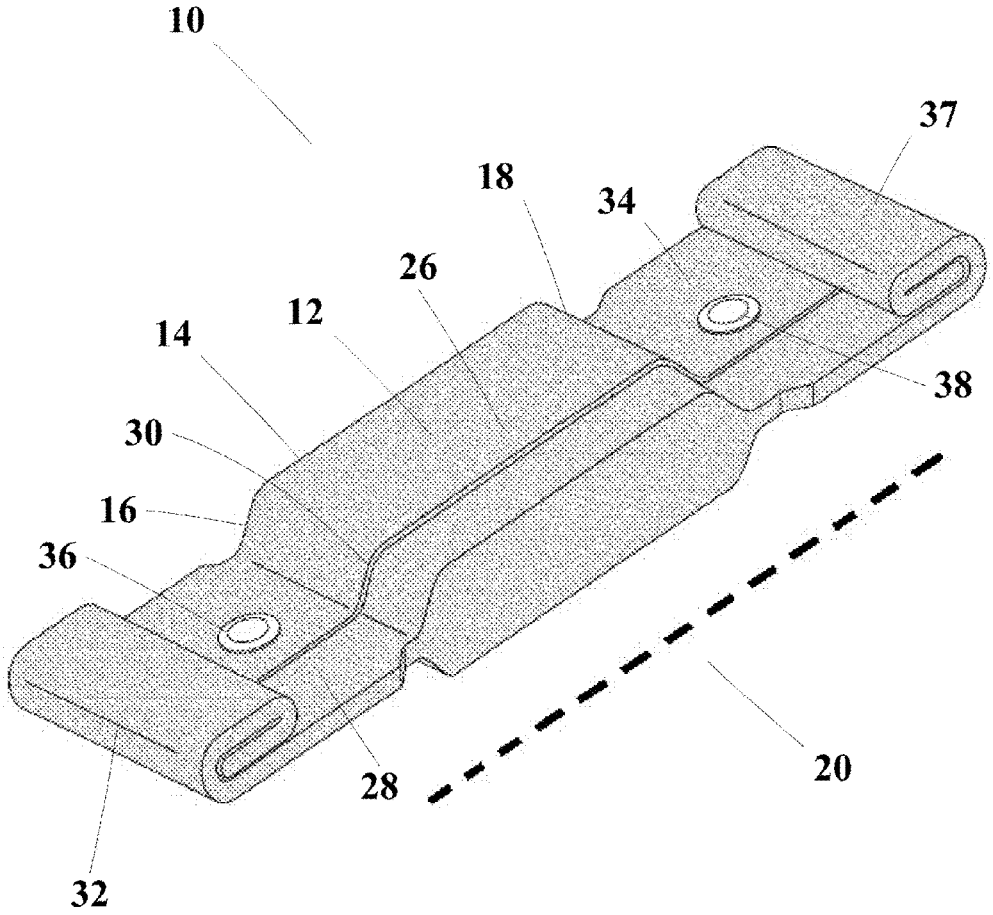
FIG. 1 displays a perspective view of a firearm retaining apparatus in accordance with embodiments.

FIG. 1 displays a perspective view of a firearm retaining apparatus 10 in accordance with embodiments. The apparatus 10 may retain a firearm, with a magnet compatible metal body, in a fixed position relative to a magnet compatible surface, such as, but not limited to an interior wall of a safe. The apparatus 10 may comprise an inner portion comprising a magnetic element 12 (enveloped in a covering 14). A major dimension may be positioned between oppositely disposed end portions 16,18 thereof and may be aligned along a major axis 20 of the magnetic element 12. The magnetic element 12 may have a front magnetic element surface 22 and a rear magnetic element surface 24 (both surfaces depicted in FIG. 4) disposed in spaced, parallel opposed relationship and perpendicular to the oppositely disposed end portions 16,18 of the magnetic element 12. In embodiments, the magnetic element 12 may comprise a rare earth magnet, such as neodymium. In embodiments, the magnetic element may comprise a magnetic material other than neodymium that may provide similar benefits, such as those of neodymium.

The covering 14 may have an outer surface positioned facing outward relative to the magnetic element 12. The covering 14, at a middle portion 26 thereof, may be wrapped around the magnetic element 12 in parallel relationship to the magnetic element major axis 20. The covering 14 may further comprise an inner surface wrapped to extend from the front magnetic element surface 22 to the rear magnetic element surface 24 and across the entirety of both the magnetic element front surface 22 and magnetic element rear surface 24 in contact therewith. In embodiments, the covering 14 may comprise woven polyester fabric material coated with PVC resin.

In embodiments, the magnetic element 12 may be rectangular in shape. In embodiments, the magnetic element 12 may be a shape other than rectangular.

The covering 14 may extend from the middle portion 26 thereof from both contact with both the front magnetic element surface 22 and the rear magnetic element surface 24 at each of the end portions 16,18 of the magnetic element 12. The covering 14 may terminate along the magnetic element major axis 20 in spaced relationship to each of the end portions 16,18 of the magnetic element 12. In embodiments, the covering 14 may define a first tab portion 28 extending along the major axis 20 from the magnetic element 12. In the first tab portion 28, the covering 14 may be folded over in parallel relationship to the major axis 20 with the inner surface of the covering 14 overlapping at least a corresponding portion of the outer surface of the covering 14 in an overlapping folded position 30. In embodiments, the first tab portion 28 may terminate in curled relationship with itself at a single curled termination point 32. In embodiments, the single curled termination point 32 may be greater in length (perpendicular to the major axis 20) than a minor dimension, or width, of the magnetic element 12 that may be perpendicular to the major dimension of the magnetic element 12.

The covering 14 may further define a second tab portion 34 disposed in a spaced, parallel, opposed relationship to the first tab portion 28 along the major axis 20 from the magnetic element 12. In embodiments, the second tab portion 34 may similarly terminate in curled relationship with itself at a second single curled termination point 37. In embodiments, the curled relationship 37 may be greater in length (perpendicular to the major axis 20) than a minor dimension, or width, of the magnetic element 12 that may be perpendicular to the major dimension of the magnetic element 12.

In embodiments, the portion of the covering 14 adjacent the magnetic element 12 may taper in thickness to form substantially flat first and second tab portions 28,34. In embodiments, the first and second tab portions 28,34 may each comprise a single curled termination point 32,37. The single curled termination points 32,37 may consist of portions of the covering 14 wherein the covering 14 may be curled over itself and affixed via an adhesive or other such suitable means of affixing such material to itself.

In embodiments, the first tab portion 28, middle portion 26, and second tab portion 34 may be aligned along the magnetic element major axis 20. In embodiments, the first tab portion 28 and second tab portion 34 may be flexible and may be pulled in a direction when the apparatus 10 is removed from a magnet compatible surface, such as when an individual engages and applies a tension force to the first tab portion 28 and the second tab portion 34. The tab portions 28,34 may act as lever arms that may reduce the amount of force needed to disengage the apparatus 10. The force applied may be exerted at the fulcrum (end of the apparatus 10 opposite the end where the force is applied).

In embodiments, the covering 14 may reduce the force required to disengage the apparatus 10 from magnetic engagement with one or more surfaces. The covering 14 may increase the distance between the magnetic element 12 and the magnetic surface, thereby reducing the effective magnitude of magnetic force being exerted when the apparatus 10 is in contact with the magnetic surface. It is noted that generally, the magnetic force of a magnet reduces at the cube of the distance ($m=1/d^3$, where m is the magnetic force of the magnet and d is the distance from the magnet to the magnet compatible surface). In embodiments, the covering 14 may comprise woven polyester coated with PVC resin.

In embodiments, the covering 14 may overlap itself. The overlapping area may comprise two layers of the covering adhered to each other via an adhesive material that may allow the covering 14 to stay properly positioned when abraded by the firearm and the magnetic surface. In embodiments, the overlapping may align along the major axis 20 and may extend adjacent at least one of the lengths of the front magnetic element surface 22 and the rear magnetic element surface 24.

In embodiments, the first tab portion 28 and second tab portion 34 may each comprise one or more grommet elements 36,38. The grommet elements 36,38 may extend the entirety of the thickness of the first and second tab portions 28,34 and may provide an aperture in the first and/or second tab portions 28,34. The grommets 36,38 may help to define the shape of the tab portions 28,34 (which may be substantially flat).

Figure 2:
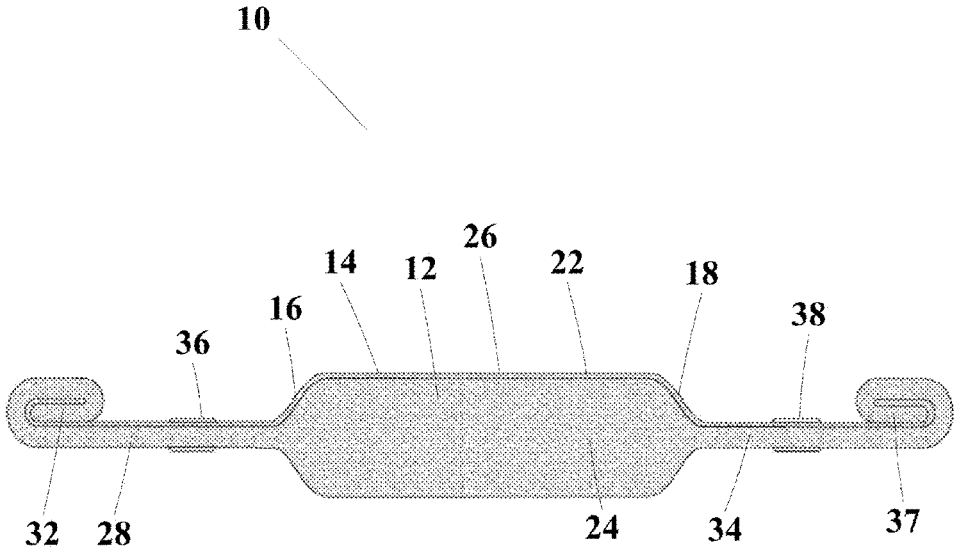
FIG. 2 displays a front/side view of a firearm retaining apparatus in accordance with embodiments.
Figure 3:
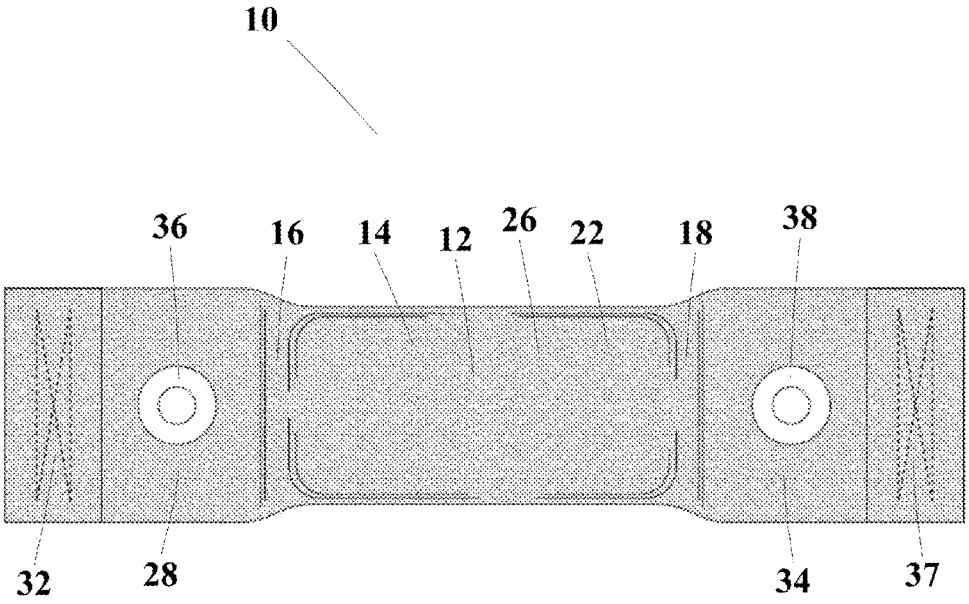
FIG. 3 displays a top view of a firearm retaining apparatus in accordance with embodiments.

FIGS. 2 and 3 respectively display a front/side and top views of a firearm retaining apparatus 10 in accordance with embodiments. The apparatus 10 may be substantially rectangular in shape. In embodiments, the apparatus 10 may be no wider than the barrel and/or grip of a firearm. When in use, the firearm retaining apparatus 10 may be magnetically engaged with a magnet compatible portion of a firearm and a magnet compatible portion of an interior portion of a safe in order to easily store the firearm in said safe. It is noted that the firearm retaining apparatus 10 may be as thin as possible in order to minimize the amount of space taken up by a firearm affixed to the firearm retaining apparatus 10.

Figure 4:
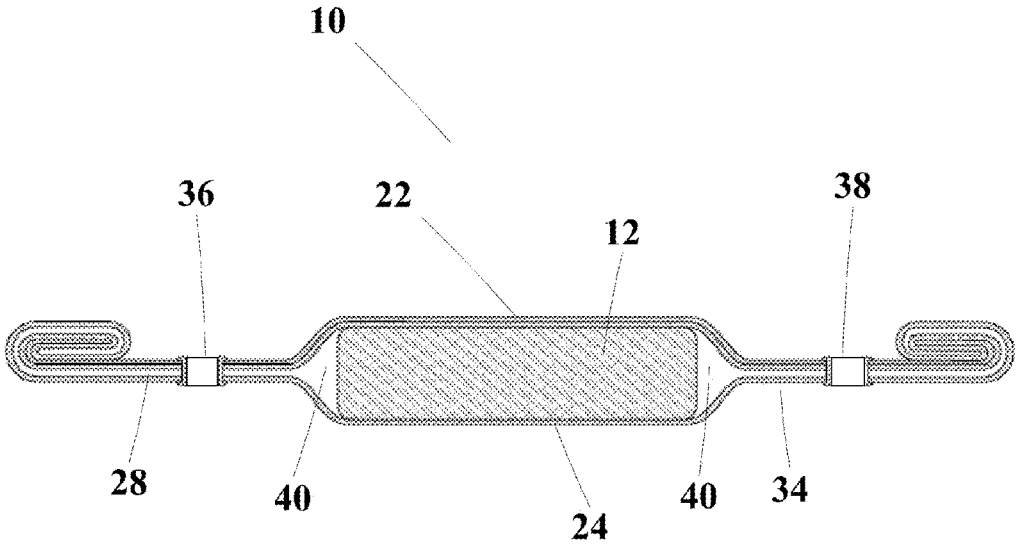
FIG. 4 displays a cross-sectional view of a firearm retaining apparatus in accordance with embodiments.

FIG. 4 displays a cross-sectional view of a firearm retaining apparatus 10 in accordance with embodiments. The magnetic element 12 may be clearly shown within the inner portion of the covering 14. The front magnetic element surface 22 and the rear magnetic element surface 24 may be shown adjacent the inner surface of the covering 14. Grommets 36,38 positioned within the covering 14 may be shown extending the thickness of the first and second tab portions 28,34. It is noted that the cross-section view may depict an interior open portion 40 extending into the first and second tab portions 28,34. In embodiments, the interior open portion 40 may exist within the covering 14. In embodiments, at least one adhesive may be used to affix the covering 14 to itself and remove the space found within the covering 14. In embodiments, the firearm retaining apparatus 10 may comprise an inner lining that may be positioned between the magnetic element 12 and the covering 14 (within the interior open portion). The inner lining may comprise polymeric foam, in embodiments. The polymeric foam may provide impact absorption characteristics when the magnet element 12 is attracted to and engages a magnetic surface. The polymeric foam may additionally reduce the noise generated when the firearm retaining apparatus 10 affixes to a magnetic surface.

Figure 5:
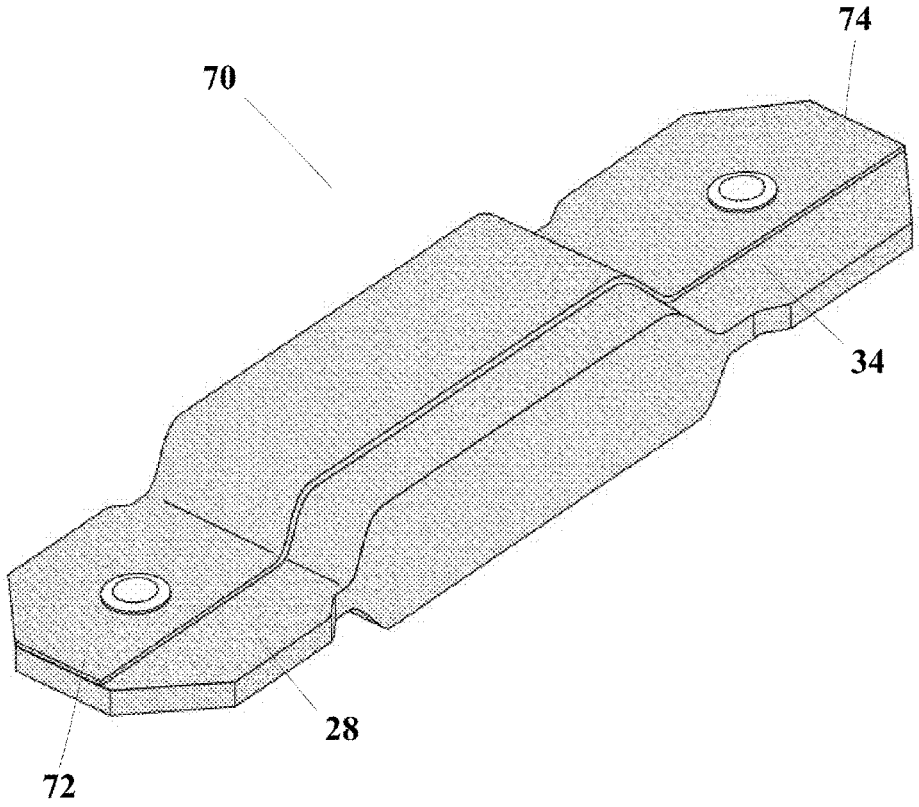
FIG. 5 displays a perspective view of an alternative firearm retaining apparatus in accordance with embodiments.

FIG. 5 displays a perspective view of an alternative firearm retaining apparatus 70 in accordance with embodiments. Apparatus 70 may comprise similar characteristics as the embodiment of apparatus 10 found in FIG. 1 except as otherwise shown in FIG. 5. Apparatus 70 may comprise first and second tab portions 28,34 terminating at angled termination points 72,74. Apparatus 70 therefore comprises less covering 14 material than apparatus 10 with single curled termination points 32,37 and may be less costly and/or easier to manufacture.

Figure 6:
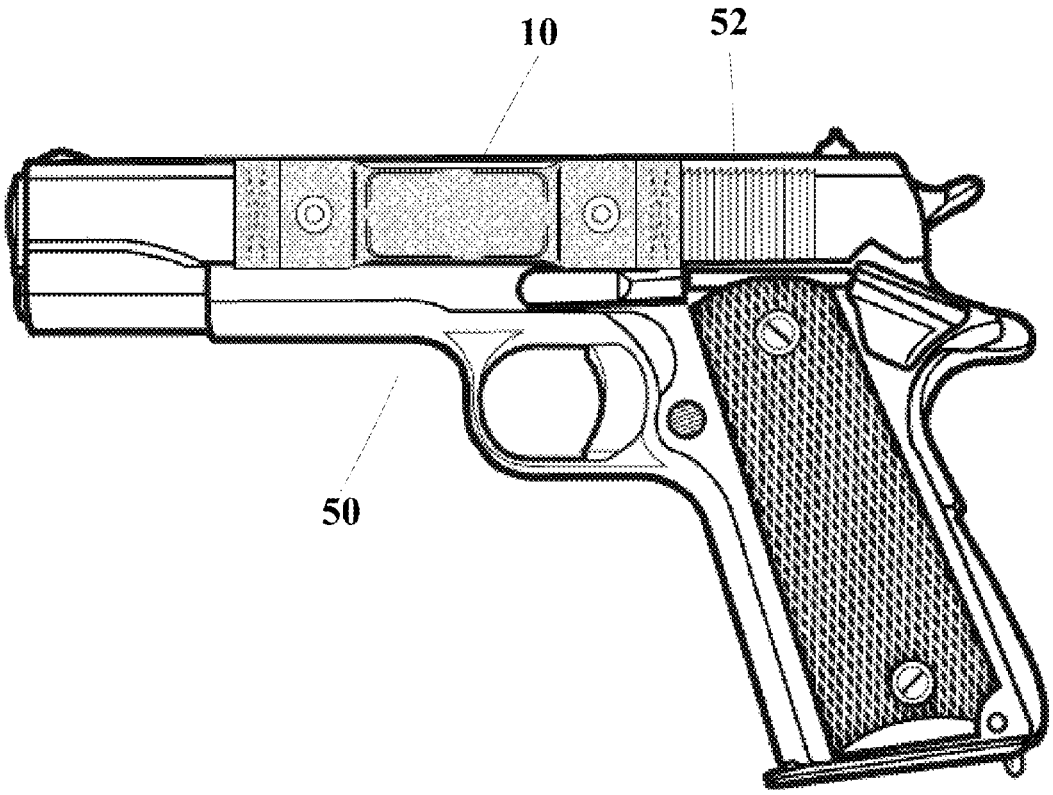
FIG. 6 displays a perspective view of a firearm retaining apparatus positioned on a firearm in accordance with embodiments.

FIG. 6 displays a perspective view of a firearm retaining apparatus 10 positioned on a firearm 50 in accordance with embodiments. Because the firearm retaining apparatus 10 contains magnetic elements, the firearm retaining apparatus 10 may be positioned on any magnet compatible surface available on a firearm 50. In embodiments, the firearm retaining apparatus 10 may be positioned adjacent the slide 52 of the firearm 50 due to the large magnet compatible surface area on the slide 52. In embodiments, the firearm retaining apparatus 10 may be smaller in width (perpendicular to the major axis 20) than the slide 52 of the firearm 50. In embodiments, the firearm retaining apparatus 10 may be larger in width (perpendicular to the major axis 20) than the slide 52 of the firearm 50. It is noted that in FIG. 6, the apparatus 10 is affixed to a side wall of a safe.

Figure 7:
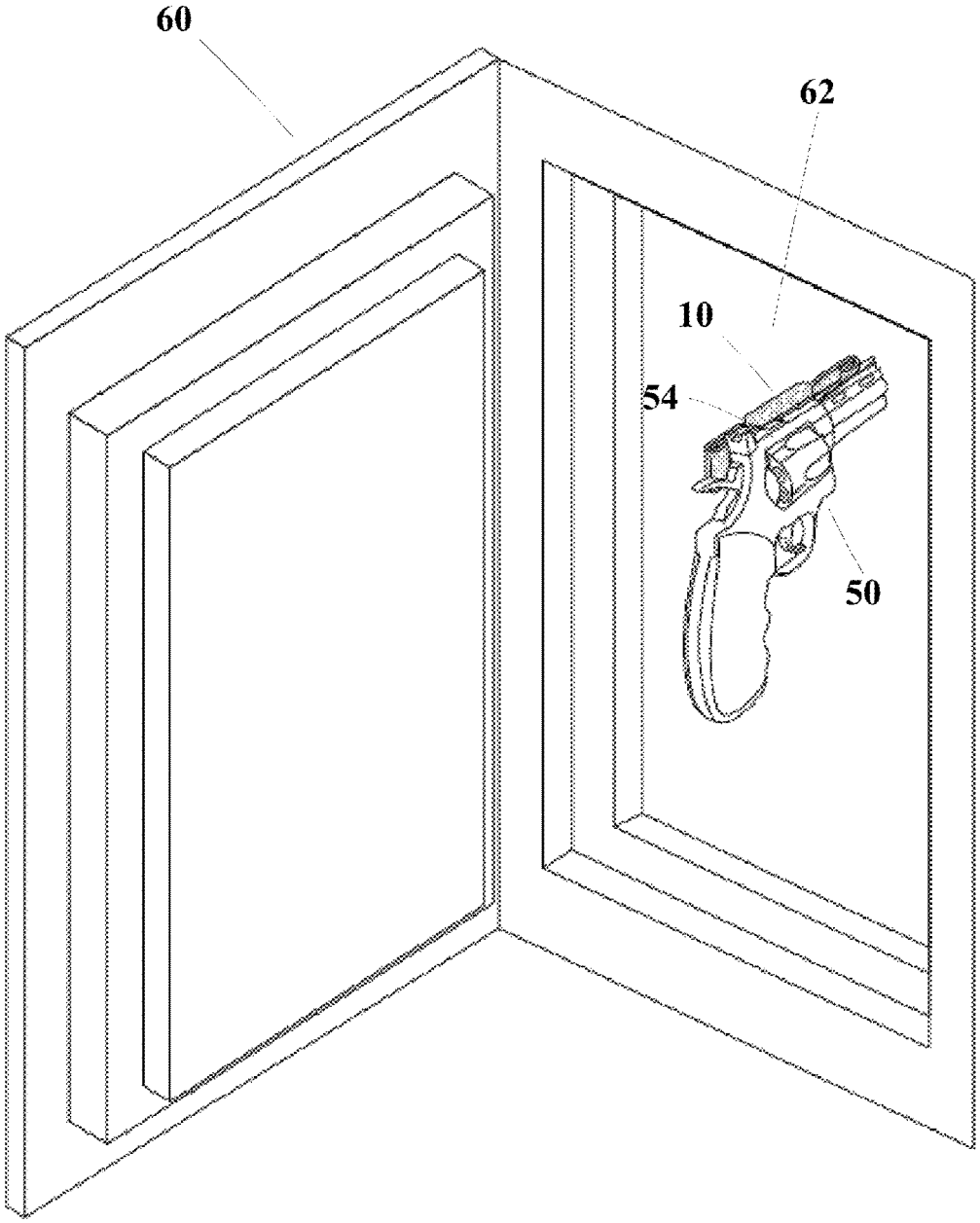
FIG. 7 displays a firearm retaining apparatus adjacent a magnetic surface and supporting a firearm in accordance with embodiments.

FIG. 7 displays a firearm retaining apparatus 10 adjacent a magnet compatible surface and supporting a firearm 50 in accordance with embodiments. When in use, the r retaining apparatus 10 may be positioned between a magnet compatible portion of a firearm 50 and a magnet compatible portion 62 of a safe 60, such as, but not limited to an inner portion of a wall of a safe 60. The firearm retaining apparatus 10 may conveniently retain a firearm 50 as well as save space within a safe 60 due to the fact that the firearm retaining apparatus 10 may provide for storage of a firearm 50 in a portion of the safe that previously was not configured to support a firearm 50. Additionally, the firearm retaining apparatus 10 may provide, to a user of a firearm 50, a conveniently positioned firearm 50 within a safe 60 so that a user may quickly and conveniently pull the firearm 50 out of the safe 60 when the firearm 50 is needed. For example, the firearm retaining apparatus 10 may be positioned on the left side of the upper body 54 (which may include a portion of one or both the frame and the barrel) of the firearm 50 (as shown in FIG. 7) with the firearm 50 facing away and affixed to a left inner wall of a safe 60.

In embodiments, the covering 14 may be unitary. In embodiments, the covering 14 may comprise at least one fabric.

For the purposes of this disclosure, the terms "magnetic" and "magnet compatible" may be defined as a surface that accepts a magnet or that is magnetically attracted to a magnet.

While this disclosure has been particularly shown and described with reference to preferred embodiments thereof and to the accompanying drawings, it will be understood by those skilled in the art that various changes in form and details may be made therein without departing from the spirit of this disclosure. Therefore, the scope of the disclosure is defined not by the detailed description but by the appended claims.

The invention claimed is:

1. An apparatus for retaining a firearm, the firearm having a magnetic metal portion, in a fixed position relative to a magnetic surface, the apparatus comprising:

a magnetic element, the magnetic element having a major dimension between oppositely disposed end portions thereof, the major dimension of the magnetic element aligned along a major axis, the magnetic element having a front magnetic element surface and a rear magnetic element surface disposed in a spaced, parallel opposed relationship;

and a covering comprising a unitary fabric member having an outer surface facing outward relative to the magnetic element, the unitary fabric member, at a middle portion thereof, wrapped around the magnetic element in parallel relationship to the major axis, the unitary fabric member having an inner surface wrapped to extend from the front magnetic element surface to the rear magnetic element surface and across the entirety of both the magnetic element front surface and magnetic element rear surface and in contact therewith;

the unitary fabric member extending from the middle portion thereof to make contact with both the front magnetic element surface and the rear magnetic element surface at each of the end portions of the magnetic element, the unitary fabric member terminating along the major axis in spaced relationship with each of the end portions of the magnetic element, the unitary fabric member defining a first tab portion extending along the magnetic element major axis from the magnetic element, the first tab portion of the unitary fabric member folded over in parallel relationship to the major axis with the inner surface overlapping at least a portion of the outer surface in an overlapping, folded position, the first tab portion terminating in a curled relationship with itself;

the unitary fabric member further defining a second tab portion disposed in spaced, parallel opposed relationship to the first tab portion along the major axis from the magnetic element, the second tab portion terminating in a curled relationship with itself, *wherein the first tab portion and second tab portion each comprise grommet elements positioned within the first tab portion and the second tab portion*;

at least one of the first tab portion and second tab portion being flexible.

[2. The apparatus of claim 1, the first tab portion and second tab portion each comprising grommet elements positioned within the first tab portion and the second tab portion.]

3. The apparatus of claim 1, the magnetic element comprising a rectangular shape.

4. The apparatus of claim 1, the first and second tab portions each comprising a single curled termination point.

5. The apparatus of claim 1, further comprising an inner lining positioned between the magnetic element and the covering, the inner lining comprising a polymeric foam.

6. The apparatus of claim 1, the magnetic element positioned within an inner portion of the apparatus.

7. The apparatus of claim 1, the magnetic element comprising neodymium.

8. The apparatus of claim 1, the covering comprising woven polyester fabric material coated with PVC resin.

9. The apparatus of claim 1, the covering reducing a tension force required to disengage the apparatus from magnetic engagement with one or more magnetic surfaces.

10. The apparatus of claim 1, further comprising at least one interior open portion adjacent the magnetic element.

11. The apparatus of claim 1, the covering reducing a tension force required to disengage the apparatus from magnetic engagement with one or more magnet compatible surfaces.

*12. An apparatus for retaining a firearm, the firearm having a magnetic metal portion, in a fixed position relative to a magnetic surface, the apparatus comprising:*

*a magnetic element, the magnetic element having a major dimension between oppositely disposed end portions thereof, the major dimension of the magnetic element aligned along a major axis, the magnetic element having a front magnetic element surface and a rear magnetic element surface disposed in a spaced, parallel opposed relationship; and*

*a covering comprising a unitary fabric member having an outer surface facing outward relative to the magnetic element, the unitary fabric member, at a middle portion thereof, wrapped around the magnetic element in parallel relationship to the major axis, the unitary fabric member having an inner surface wrapped to extend from the front magnetic element surface to the rear magnetic element surface and across the entirety of both the magnetic element front surface and magnetic element rear surface and in contact therewith;*

*the unitary fabric member extending from the middle portion thereof to make contact with both the front magnetic element surface and the rear magnetic element surface at each of the end portions of the magnetic element, the unitary fabric member terminating along the major axis in spaced relationship with each of the end portions of the magnetic element, the unitary fabric member defining a first tab portion extending along the magnetic element major axis from the magnetic element;*

*the unitary fabric member further defining a second tab portion disposed in spaced, parallel opposed relationship to the first tab portion along the major axis from the magnetic element;*

*at least one of the first tab portion and second tab portion being flexible and the first tab portion and second tab portion each comprising grommet elements positioned within the first tab portion and the second tab portion.*

*13. The apparatus of claim 12, wherein the first and second tabs further comprise substantially flat first and second tabs.*

*14. The apparatus of claim 12, the covering comprising woven polyester fabric material coated with PVC resin.*

*15. A magnetic device for retaining a firearm in a fixed position relative to a magnet compatible surface, the magnetic device comprising:*

*a magnetic element having a length extending along a first axis and a width extending along a second axis, the magnetic element comprising:*

*a proximal end and a distal end, wherein the length of the magnetic element extends from the proximal end to the distal end; and,*

*a front magnetic element surface and a rear magnetic element surface;*

*a fabric cover enveloping the magnetic element and extending across the front magnetic element surface and the rear magnetic element surface, the fabric cover comprising:*

*an outer surface facing outwardly relative to the magnetic element;*

*an inner surface facing inwardly relative to the magnetic element, wherein a first portion of the inner surface is in physical contact with the front magnetic element surface, and a second portion of the inner surface is in physical contact with the rear magnetic element surface;*

*a first tab extending along the first axis and away from the proximal end of the magnetic element, the first tab fixedly coupled with the fabric cover; and,*

*a second tab extending along the first axis and away from the distal end of the magnetic element, the second tab fixedly coupled with the fabric cover,*

*wherein the first and second tabs comprise respective first and second grommets,*

*wherein the first and second tabs further comprise substantially flat first and second tabs, respectively,*

*wherein the second tab is disposed in a spaced, parallel, opposed relationship to the first tab along the first axis from the magnetic element.*

*16. The magnetic device of claim 15, wherein the first tab is disposed directly adjacent to the proximal end of the magnetic element, and the second tab is disposed directly adjacent to the distal end of the magnetic element.*

*17. The magnetic device of claim 15, wherein a maximum width of the first and second tabs is greater than the width of the magnetic element.*

*18. The magnetic device of claim 15, wherein the fabric cover comprises a unitary fabric cover comprising polyester.*

*19. The magnetic device of claim 15, wherein the fabric cover comprises the first and second tabs.*

*20. A magnetic device for retaining a firearm in a fixed position relative to a magnet compatible surface, the magnetic device comprising:*

*a magnetic element comprising a front magnetic element surface and a rear magnetic element surface;*

*a fabric cover extending across the front magnetic element surface and the rear magnetic element surface, the fabric cover comprising:*

*an outer surface facing outwardly relative to the magnetic element;*

*an inner surface facing inwardly relative to the magnetic element, wherein a first portion of the inner surface is in physical contact with the front magnetic element surface, and a second portion of the inner surface is in physical contact with the rear magnetic element surface; and,*

*a first tab fixedly coupled with the fabric cover, wherein the first tab comprises a first grommet.*

*21. The magnetic device of claim 20, further comprising a second tab fixedly coupled with the fabric cover.*

*22. The magnetic device of claim 21, wherein the first tab comprises a first grommet, and the second tab comprises a second grommet.*

*23. The magnetic device of claim 22, wherein the first and second grommets comprise respective first and second apertures that extend through the entirety of the thickness of the first and second tabs, respectively.*

*24. The magnetic device of claim 23, wherein the fabric cover further comprises the first and second tabs.*

*25. The magnetic device of claim 21, wherein the first and second tabs extend in a plane that is parallel to a major axis of the magnetic element.*

*26. The magnetic device of claim 20, wherein the fabric cover comprises a unitary woven fabric cover.*

*27. The magnetic device of claim 20, wherein the magnetic element comprises a rectangular shape, such that the length of the magnetic element is greater than the width of the magnetic element.*

*28. The magnetic device of claim 20, wherein a maximum width of the first and second tabs is greater than a maximum width of the magnetic element.*

*29. The magnetic device of claim 20, wherein the front magnetic element surface and the rear magnetic element surface are disposed in a spaced, parallel opposed relationship relative to one another.*

*30. The magnetic device of claim 20, wherein the first tab is disposed directly adjacent to the proximal end of the magnetic element, and the second tab is disposed directly adjacent to the distal end of the magnetic element.*

* * * * *